(12) United States Patent
Mukasa et al.

(10) Patent No.: US 9,929,446 B2
(45) Date of Patent: Mar. 27, 2018

(54) BATTERY WIRING MODULE

(71) Applicant: Yazaki Corporation, Minato-ku, Tokyo (JP)

(72) Inventors: Hirotaka Mukasa, Kakegawa (JP); Hirokuni Koike, Kakegawa (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 176 days.

(21) Appl. No.: 15/141,972

(22) Filed: Apr. 29, 2016

(65) Prior Publication Data

US 2016/0248128 A1  Aug. 25, 2016

Related U.S. Application Data

(63) Continuation of application No. PCT/JP2014/079124, filed on Oct. 31, 2014.

(30) Foreign Application Priority Data

Nov. 1, 2013 (JP) ................................. 2013-228559

(51) Int. Cl.
*H01M 2/24* (2006.01)
*H01M 10/48* (2006.01)
(Continued)

(52) U.S. Cl.
CPC .......... *H01M 10/482* (2013.01); *H01M 2/206* (2013.01); *H01M 2/266* (2013.01);
(Continued)

(58) Field of Classification Search
CPC ............... H01M 10/482; H01M 2/206; H01M 10/4257; H01M 10/425; H01M 2/266; H01M 2220/20; H01M 2010/4271
See application file for complete search history.

(56) References Cited

U.S. PATENT DOCUMENTS 8,299,801 B2  10/2012  Yano et al.
8,394,519 B2  3/2013  Naganuma
(Continued)

FOREIGN PATENT DOCUMENTS

JP  2009-105010 A  5/2009
JP  2010-080135 A  4/2010
(Continued)

OTHER PUBLICATIONS

Jan. 27, 2015—International Search Report—Intl App PCT/JP2014/079124.
(Continued)

*Primary Examiner* — Cynthia K Walls
(74) *Attorney, Agent, or Firm* — Banner & Witcoff, Ltd.

(57) ABSTRACT

A battery wiring module includes: connection members electrically connecting adjacent positive and negative electrodes in an electrode row of a battery assembly; voltage detection lines connecting the connection members and a control unit; and a holding member holding the connection members and the voltage detection lines, and including an electric wire arrangement part in which the voltage detection lines are arranged and which includes electric wire outlets. The batteries are divided into groups so as to correspond to the electric wire outlets, respectively, such that the voltage detection lines belonging to one of the groups are pulled out from the electric wire arrangement part toward the control unit through the corresponding one of the electric wire outlets.

4 Claims, 3 Drawing Sheets

(51) Int. Cl.
*H01M 2/26* (2006.01)
*H01M 10/42* (2006.01)
*H01M 2/20* (2006.01)

(52) U.S. Cl.
CPC ..... *H01M 10/425* (2013.01); *H01M 10/4257* (2013.01); *H01M 2010/4271* (2013.01); *H01M 2220/20* (2013.01)

(56) References Cited

U.S. PATENT DOCUMENTS

| | | |
|---|---|---|
| 8,674,703 B2 | 3/2014 | Yano et al. |
| 8,777,668 B2 | 7/2014 | Ikeda et al. |
| 2009/0111007 A1 | 4/2009 | Naganuma |
| 2010/0073005 A1 | 3/2010 | Yano et al. |
| 2010/0124693 A1 | 5/2010 | Kosugi et al. |
| 2011/0064987 A1* | 3/2011 | Ogasawara ........... H01M 2/206 429/121 |
| 2012/0231638 A1 | 9/2012 | Ikeda et al. |
| 2012/0319695 A1 | 12/2012 | Yano et al. |
| 2012/0328920 A1 | 12/2012 | Takase et al. |
| 2013/0002017 A1 | 1/2013 | Yano et al. |

FOREIGN PATENT DOCUMENTS

| | | |
|---|---|---|
| JP | 2010-123299 A | 6/2010 |
| JP | 2010-170884 A | 8/2010 |
| JP | 2011-228216 A | 11/2011 |
| JP | 2012-059663 A | 3/2012 |
| JP | 2013-105571 A | 5/2013 |
| JP | 2013-171746 A | 9/2013 |
| WO | 2011-111676 A1 | 9/2011 |

OTHER PUBLICATIONS

May 3, 2016—(WO) International Preliminary Report on Patentability (IPRP)—App PCT/JP2014/079124, Eng Tran.

Aug. 25, 2017—(JP) Notification of Reasons for Refusal—App 2013-228559, Eng Tran.

* cited by examiner

BATTERY WIRING MODULE

CROSS REFERENCE TO RELATED APPLICATION(S)

This application is a continuation of PCT application No. PCT/JP2014/079124, which was filed on Oct. 31, 2014 based on Japanese Patent Application (No. 2013-228559) filed on Nov. 1, 2013, the contents of which are incorporated herein by reference.

BACKGROUND OF THE INVENTION

1. Field of the Invention

The present invention relates to a battery wiring module.

2. Description of the Related Art

For example, a power supply apparatus is mounted on an electric vehicle that runs using an electric motor, on a hybrid vehicle that runs using both a combustion engine and an electric motor, or on the like. The power supply apparatus includes a battery assembly formed by a plurality of batteries (secondary batteries) in which a positive electrode is provided at one end and a negative electrode is provided at the other end. Then, in order obtain a desired voltage, the plurality of batteries are connected in series. Thus, these batteries are arranged in alternate orientations such that the positive electrode and the negative electrode may be located adjacent to each other. Then, the batteries are integrated together by being bundled with a binding band or the like, for example, in a state of being pinched by a pair of end plates.

Then, a battery wiring module for connecting the batteries in series so as to output a direct current from the positive electrode and the negative electrode of respective batteries provided on both ends is attached to the plurality of batteries having been integrated. JP-A-2013-105571 illustrates a configuration of a battery wiring module. The battery wiring module includes: a plurality of connection members (busbars) for connecting adjacent positive electrode and negative electrode of batteries so as to establish series connection of the plurality of batteries; a plurality of battery voltage detection terminals each connected to the corresponding busbar; a plurality of electric wires (voltage detection lines) each connected to the corresponding battery voltage detection terminal; and a holding member for holding the busbar, the battery voltage detection terminal, and the voltage detection line.

SUMMARY OF THE INVENTION

Meanwhile, for the purpose of performance improvement in an electric vehicle or a hybrid vehicle, output power enhancement in the power supply apparatus is required. For example, employable approaches for achieving output power enhancement in the power supply apparatus include a method of increasing the number of batteries constituting the battery assembly. In this case, in association with the increase in the number of batteries, the number of voltage detection lines also increases.

The voltage detection line is provided such that one-end side is connected to a battery voltage detection terminal, then the voltage detection line is arranged in an electric wire arrangement part (an arrangement path) formed in a holding member and then the other end side is connected to a control unit including a circuit board for battery voltage monitoring. At that time, in the electric wire arrangement part, an arrangement space leading from each battery voltage detection terminal to the circuit board need be ensured for each voltage detection line. In a case that one stack includes a few batteries, only a few voltage detection lines are employed and hence a remarkably large arrangement space is not required. In contrast, for example, in a case that one stack includes ten plus a few batteries or several tens batteries, ten plus a few or more voltage detection lines also become necessary and hence a larger arrangement space need be ensured. As in the battery wiring module disclosed in JP-A-2013-105571, in order arrange ten plus a few voltage detection lines of one stack in the same electric wire arrangement part and then to collectively connect these voltage detection lines to the circuit board, a remarkably large arrangement space need be ensured in the electric wire arrangement part. As a result, the size increase in the electric wire arrangement part causes a size increase in the battery wiring module. Thus, the battery wiring module tends to become larger when the number of batteries of one stack increases. Further, the voltage detection line of a battery arranged distant from the circuit board need have a longer electric wire length than the voltage detection line of a battery arranged close to the circuit board. Thus, for the purpose of size reduction of such a battery wiring module, wire saving of the voltage detection lines becomes more important when the number of batteries of one stack increases.

The present invention has been made in view of this situation. An object thereof is to simultaneously achieve size reduction of a battery wiring module and wire saving of voltage detection lines.

The object of the present invention is achieved by the following configurations.

(1) A battery wiring module attachable to a battery assembly including a plurality of batteries, each of the plurality of batteries including a positive electrode and a negative electrode, the battery assembly in which the plurality of batteries are arranged so as to form two electrode rows such that the positive electrode and the negative electrode of adjacent batteries are arranged to be adjacent to each other in each of the electrode rows, the battery wiring module including: a plurality of connection members which are attached to the electrode rows, and which electrically connect adjacent positive electrode and negative electrode in each of the electrode rows; a plurality of voltage detection lines, each of which includes a first terminal electrically connected to a corresponding one of the plurality of connection members and a second terminal electrically connected to a control unit for battery voltage monitoring disposed between and along the electrode rows; and a holding member which holds the plurality of connection members and the plurality of voltage detection lines for each of the electrode rows, wherein the holding member includes an electric wire arrangement part in which the plurality of voltage detection lines are arranged and which is formed along the electrode rows, wherein the electric wire arrangement part includes a plurality of electric wire outlets, and wherein the plurality of batteries are divided into a plurality of groups so as to correspond to the plurality of electric wire outlets, respectively, such that the second terminals of the plurality of voltage detection lines belonging to one of the groups are pulled out from the electric wire arrangement part toward the control unit through the corresponding one of the electric wire outlets.

According to the battery wiring module having the configuration of the above-mentioned (1), a plurality of batteries constituting the battery assembly are divided into a plurality of groups (battery groups) and then the second terminals of the voltage detection lines belonging to each battery group are pulled out through the electric wire outlet. That is, the plurality of voltage detection lines electrically connected through the connection members to the plurality of batteries constituting the battery assembly are pulled out in a distributed manner by a predetermined number of voltage detection lines (the number may be the same number or a different number) through the respective electric wire outlets and then electrically connected to the control unit. Thus, it is not necessary to arrange all the voltage detection lines everywhere in the electric wire arrangement part (that is, over the entire length). This reduces the arrangement space to be ensured in the electric wire arrangement part and, at the same time, the number of voltage detection lines arranged in the same electric wire arrangement part can be suppressed to an appropriate value.

(2) The battery wiring module described in the above-mentioned configuration (1), wherein the control unit includes a plurality of electric wire connection parts to which the second terminals of the plurality of voltage detection lines are electrically connected, respectively, wherein the electric wire arrangement part is formed between each of the electrode rows and the control unit, and wherein the plurality of electric wire outlets are positioned to oppose the respective electric wire connection parts of the control unit.

According to the battery wiring module having the configuration of the above-mentioned (2), the plurality of electric wire outlets are positioned to oppose the respective electric wire connection parts of the control unit. Thus, the voltage detection lines pulled out through the electric wire outlets can be electrically connected to the control unit in shorter arrangement distances without large detouring. Thus, the arrangement length of each voltage detection line in the electric wire arrangement part can be reduced. Accordingly, the total extension of these voltage detection lines can be suppressed and hence wire saving can be achieved. Further, the arrangement space to be ensured in the electric wire arrangement part can reliably be reduced.

(3) The battery wiring module described in the above-mentioned configuration (1) or (2), wherein the electric wire arrangement part is formed in a gutter shape including a bottom extending along an arrangement direction of the batteries and first and second walls extending upward from the bottom, the first wall being closer to the control unit than the second wall, and wherein the electric wire outlets are formed by cutting the first wall.

(4) The battery wiring module described in the above-mentioned configuration (3), wherein the plurality of electric wire outlets are formed at predetermined intervals in the first wall.

According to the present invention, size reduction of a battery wiring module and wire saving of voltage detection lines are simultaneously achieved.

DETAILED DESCRIPTION OF THE EXEMPLARY EMBODIMENTS

A battery wiring module according to an embodiment of the present invention is described below with reference to the accompanying drawings.

Figure 1:
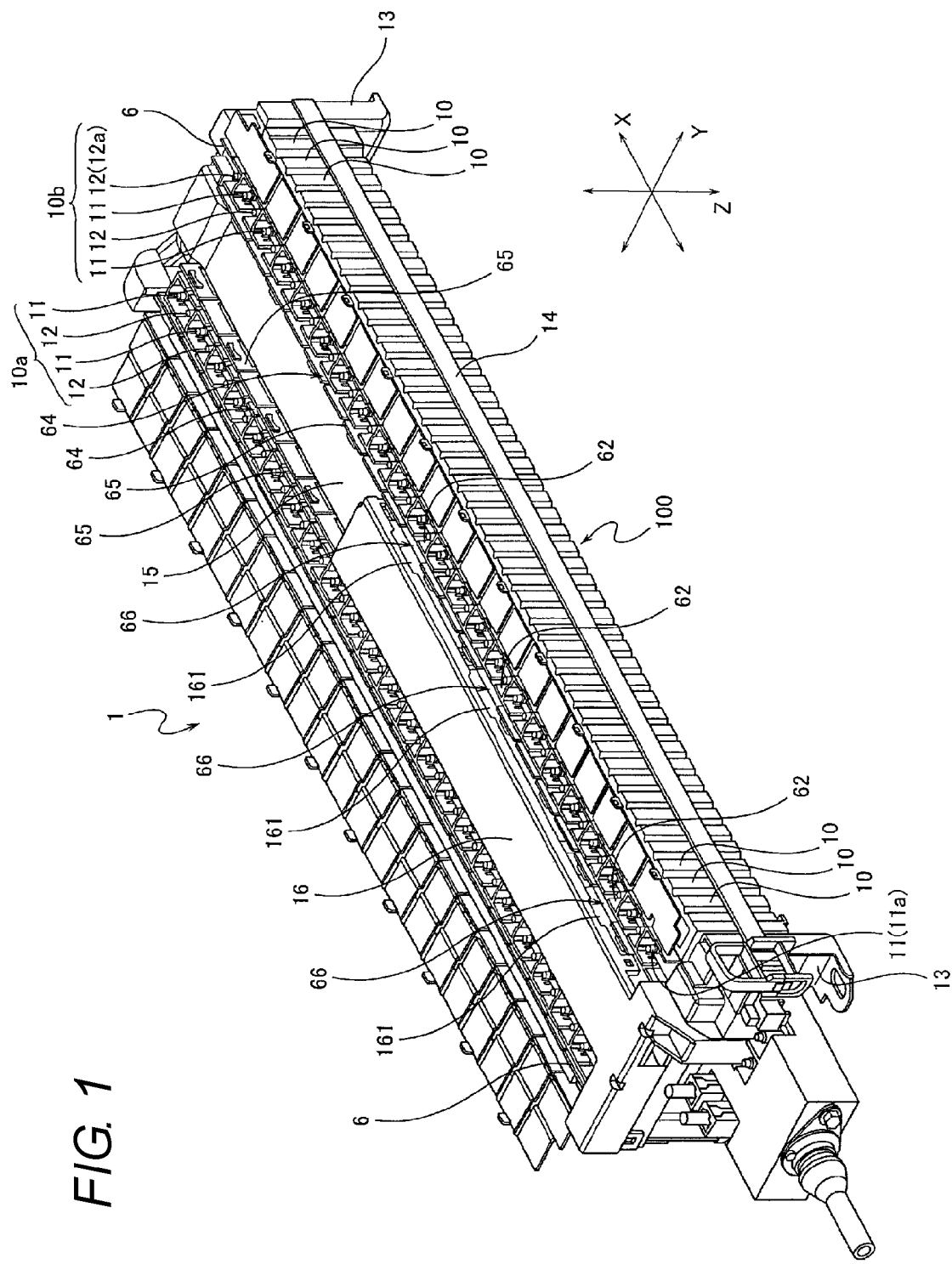
FIG. 1 is a perspective view showing an overall configuration of a battery wiring module according to an embodiment of the present invention.

For example, a battery wiring module 1 according to an embodiment of the present invention may be a circuit module for connection of a battery assembly of a power supply apparatus mounted on an electric vehicle that runs using an electric motor, on a hybrid vehicle that runs using both a combustion engine and an electric motor, or on the like. However, its applications are not limited to this. Here, in the following description, the directions indicated by arrows X in FIG. 1 are referred to as frontward and rearward directions, the directions indicated by arrows Y are referred to as right and left directions, and the directions indicated by arrows Z are referred to as up and down directions. Here, among the up and down directions, the direction going upward in FIG. 1 is identified as the upward direction (the upper side) and the direction going downward is identified as the downward direction (the lower side). However, the frontward and rearward directions, the right and left directions, and the up and down directions may be not in agreement with the directions, for example, in a state that the battery wiring module is mounted (e.g., the frontward and rearward directions, the right and left directions, and the up and down directions of an automobile).

As shown in FIG. 1, the battery wiring module 1 is attached to two electrode rows 10*a* and 10*b* of a battery assembly 100 formed by arranging a plurality of batteries 10 having a positive electrode 11 and a negative electrode 12 such that electrodes having mutually different polarities are arrayed adjacent to each other. For example, each battery 10 has a rectangular flat-plate shape. Then, the positive electrode 11 in a cylindrical shape protrudes on one-end side in an upper part and the negative electrode 12 in a cylindrical shape protrudes on the other end side in an upper part, such that nuts can be screwed on. These batteries 10 are arranged in alternate orientations such that the positive electrode 11 and the negative electrode 12 may be arrayed adjacent to each other. Then, the batteries 10 are pinched between a pair of plate-shaped members (end plates) 13. Then, when these end plates 13 are bound by a clamping member (such as a belt-shaped band and a metal plate) 14, the plurality of batteries 10 are bundled into the form of the battery assembly 100. Here, a member (spacer) for electrically insulating these batteries 10 may be inserted between adjacent batteries 10. Further, the battery 10 may be contained and held in a holding case having electric insulating property.

In the battery 10, a gas releasing port (not shown) is formed between the positive electrode 11 and the negative electrode 12 (e.g., in the middle part between the electrodes). For example, such a gas releasing port is opened in the electrode surface (the face where the positive electrode 11 and the negative electrode 12 protrude) of the battery 10 and is formed such that the opening part is closed with a thin metal film or the like. By virtue of this, when gas is generated in the inside of the battery 10 so that the pressure in the inside of the battery becomes higher than a predetermined value, the metal film is fractured and hence the gas is released through the gas releasing port. Thus, in the battery assembly 100, a smoke exhausting duct 15 for exhausting the released gas to the outside is provided in an upper part of the battery 10. The smoke exhausting duct 15 extends along the arrangement directions (the frontward and rearward directions) of the batteries 10 and has a gas inlet (not shown) in fluid communication with the gas releasing port of each battery 10. In this case, a sealing member (not shown) is provided in the fluid communication part between the gas releasing port of the battery 10 and the gas inlet of the smoke exhausting duct 15. Then, these fluid communication parts are maintained airtight by the sealing members so that gas leakage from a part other than a gas exhausting port (not shown) of the smoke exhausting duct 15 is avoided.

Figure 2:
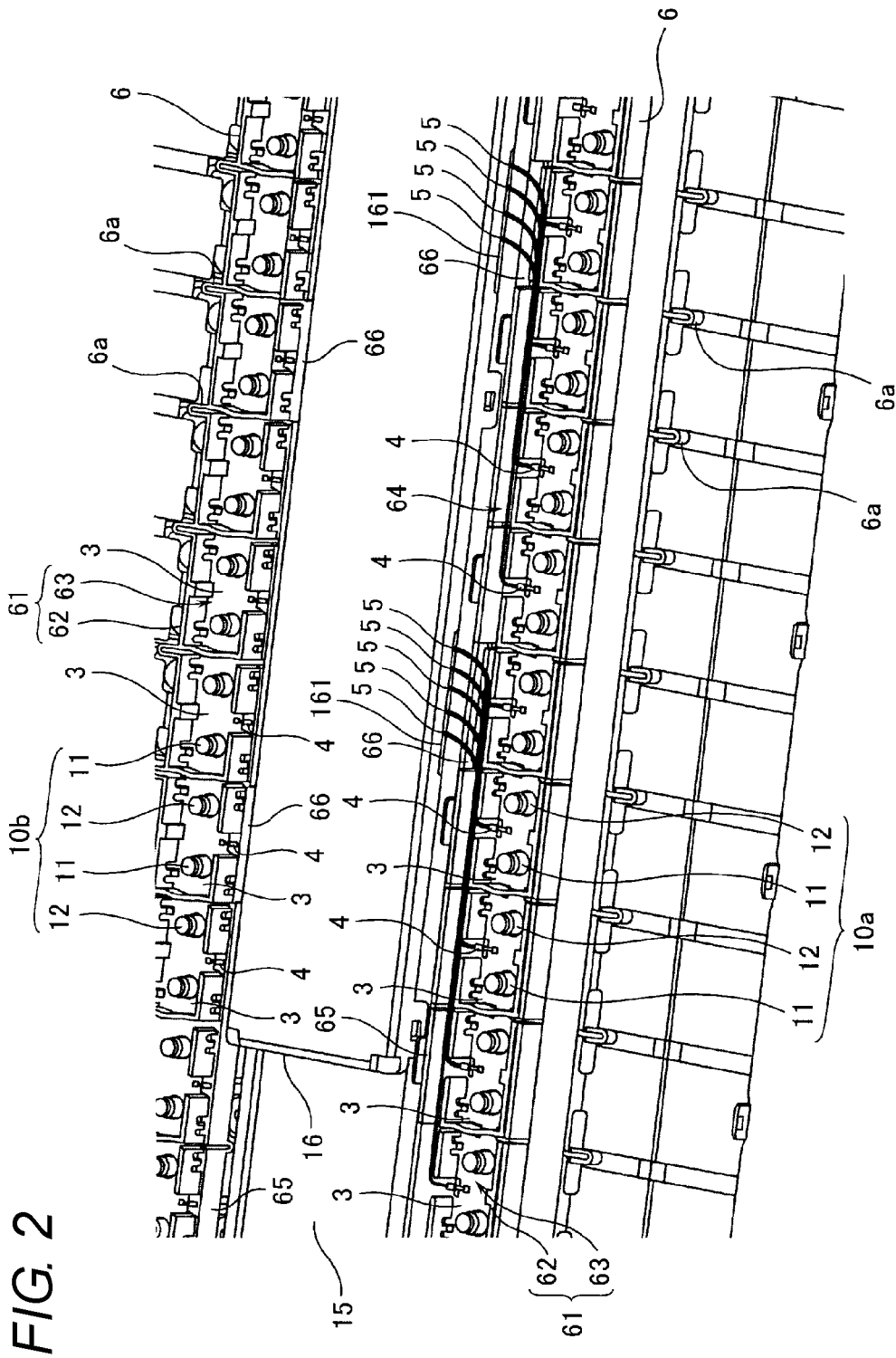
FIG. 2 is a diagram showing a battery wiring module of FIG. 1 in a partly enlarged manner.

As shown in FIG. 2 in a partly enlarged manner, the battery wiring module 1 includes: busbars 3 serving as a plurality of connection members for electrically connecting adjacent positive electrode 11 and negative electrode 12 in each of the electrode rows 10a, 10b of the battery assembly 100; a plurality of voltage detection lines 5, one-end sides (first terminals) of which are electrically connected to the busbars 3, and other end sides (second terminals) of which are electrically connected to a control unit 16 for battery voltage monitoring disposed between and along the two electrode rows 10a, 10b; and a holding member 6 for holding the busbars 3 and the voltage detection lines 5 for each of the electrode rows 10a, 10b.

Here, the control unit 16 is an electronic component for detecting the voltage of each battery 10 and then, on the basis of the detected voltage value, performs control such as charging and discharging of each battery 10. The control unit 16 includes: a microcomputer; and a circuit board provided with a detection circuit for the voltage, the electric current, the temperature, or the like of each battery 10. Then, these are contained in a case and then attached to an upper wall of the smoke exhausting duct 15. In the present embodiment, the control unit 16 is formed into an approximately rectangular parallelepiped shape. Then, the longitudinal direction of the control unit 16 is arranged along the electrode rows 10a and 10b. The control unit 16 is positioned between the electrode rows 10a and 10b on one side in the frontward and rearward directions (e.g., on a side opposite to the gas exhausting port of the smoke exhausting duct 15). The control unit 16 is connected to each busbar 3 through the voltage detection line 5 so as to be electrically connected to each battery 10. By virtue of this, the voltage of each battery 10 is outputted through the voltage detection line 5 to the control unit 16.

The busbar 3 is a connection member that has electrical conductivity and that is used for electrically connecting adjacent positive electrode 11 and negative electrode 12 in each electrode row 10a or 10b. The embodiment is not limited to particular one. However, in the present embodiment, an example is premised that the busbar 3 is employed as the connection member. For example, the busbar 3 is formed by punching, bending, or the like of a conductor flat plate and has holes (electrode holes) through which adjacent positive electrode 11 and negative electrode 12 of the battery 10 are inserted. When nuts or the like are screwed onto the electrodes (the positive electrode 11 and the negative electrode 12) inserted into such electrode holes so as to protrude, the busbar 3 is fixed to the battery assembly 100 and connects together a positive electrode 11 and a negative electrode 12 of adjacent batteries 10 so that series connection is established. Here, two electrode holes are formed in the busbar 3 used for series connection of adjacent positive electrode 11 and negative electrode 12 of the batteries 10 and one electrode hole alone is formed in the busbar connected to a representative positive electrode 11 (11a) or a representative negative electrode 12 (12a) of the battery assembly 100. The representative positive electrode 11a is the positive electrode 11 of the battery 10 arranged on one-end side in the frontward and rearward directions and the representative negative electrode 12a is the negative electrode 12 of the battery 10 arranged on the other-end side in the frontward and rearward directions. Thus, a direct-current output from the battery assembly 100 can be obtained through the representative positive electrode 11 a and the representative negative electrode 12a.

In the busbar 3, an electric wire joining part 4 is formed that is used for joining of the voltage detection line 5. In this case, for example, the voltage detection line 5 whose insulating cover has been stripped so that the conductor has been exposed may be joined to the electric wire joining part 4 by ultrasonic jointing, soldering, or the like. Here, in place of the configuration that the electric wire joining part 4 used for electrical connection to the voltage detection line 5 is formed in the busbar 3 itself, for example, a voltage detection terminal formed separately from the busbar 3 by punching, bending, or the like of a conductor flat plate may be employed so that the voltage detection line 5 may be electrically connected to the busbar 3. In this case, it is sufficient that a compression bonding part is provided in the voltage detection terminal and then the conductor of the voltage detection line 5 is joined to the compression bonding part. Then, when a through hole into which one electrode (the positive electrode 11 or the negative electrode 12) to be connected by the busbar 3 is to be inserted is formed in the voltage detection terminal and then nuts or the like are screwed onto the electrodes (the positive electrode 11 and the negative electrode 12) having been inserted into the through holes so as to protrude, the voltage detection terminal together with the busbar 3 can be fixed to the battery assembly 100.

For example, the voltage detection line 5 may include: a conductor having electrical conductivity; and an insulating cover for covering the outer periphery of the conductor. Such a conductor may be formed by a plurality of core wires twisted together or, alternatively, from a single core wire.

The holding member 6 is formed from an electrical insulation material such as resin. Then, a plurality of busbar containing parts 61 connected by hinges (bent pieces having elasticity) 6a are disposed in the form of a pair of two rows extending along the frontward and rearward directions in correspondence to the electrode rows 10a and 10b of the battery assembly 100. The busbar containing part 61 is configured to contain one busbar 3 in one containing chamber 63 formed by being surrounded by a frame-shaped peripheral wall 62 extending upward from the bottom of the holding member 6. The busbar 3 contained in the containing chamber 63 is locked by claw parts 6b protruding from the peripheral wall 62 so as to be held in the busbar containing part 61. Here, in addition to the locking by the claw parts 6b, the method of holding the busbar 3 may be joining with adhesives, or the like.

Figure 3:
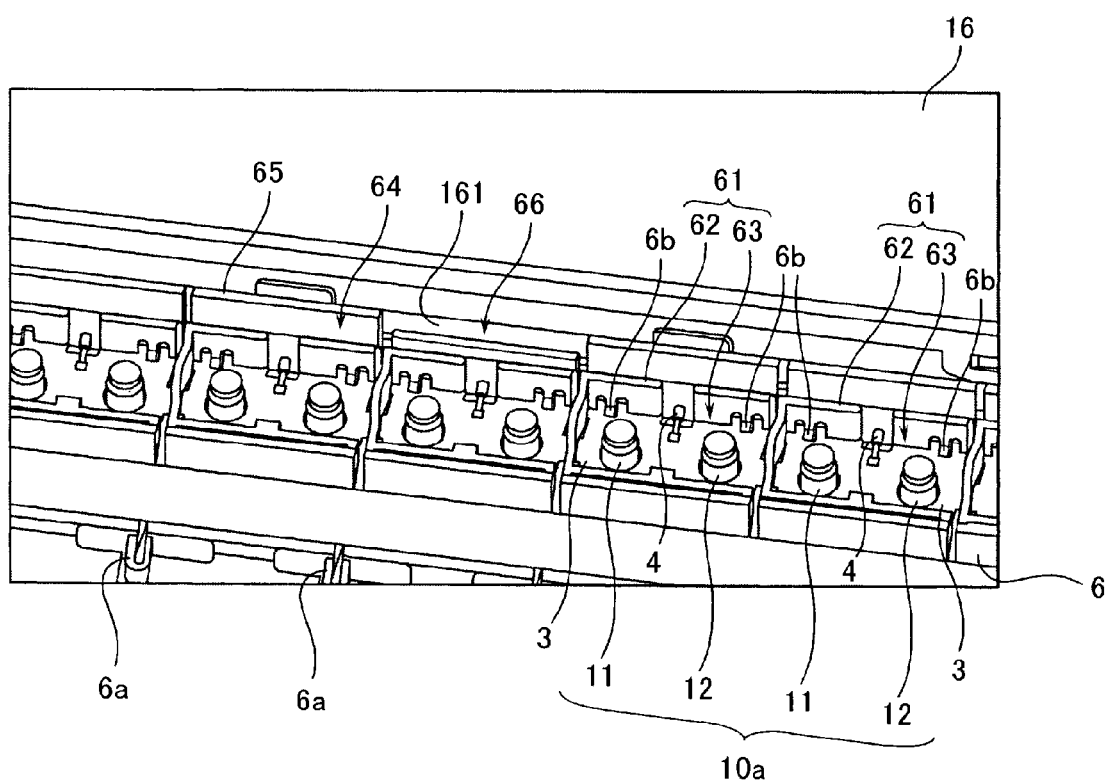
FIG. 3 is a main-part enlarged perspective view showing the configuration of an electric wire arrangement part and an electric wire outlet shown in FIG. 2.

As shown in FIG. 3, in the holding member 6, an electric wire arrangement part 64 for arranging the voltage detection lines 5 is formed along the electrode rows 10a and 10b. In this case, the electric wire arrangement part 64 is formed over the entire length (the dimension in the frontward and rearward directions) of the battery assembly 100. Then, a part thereof extends along the control unit 16 (specifically, along a side part in the right and left directions). Here, FIG. 3 is an enlarged view showing the configuration of the electric wire arrangement part 64 on the electrode row 10a side in FIG. 2 in a state that illustration of the voltage detection lines 5 is omitted. The electric wire arrangement part 64 is formed in a gutter shape including a bottom extending along the arrangement directions of the batteries 10 and a pair of walls extending upward from the bottom.

Specifically, an arrangement wall 65 extends upward from the bottom of the holding member 6 in parallel to the peripheral wall 62 on the inner side of the right and left directions with the containing chamber 63 and the peripheral wall 62 in between so that an arrangement space for the voltage detection lines 5 is formed in the space surrounded by the bottom, the peripheral wall 62, and the arrangement wall 65 of the holding member 6.

The electric wire arrangement part 64 includes a plurality of electric wire outlets 66 through which the other end sides of the voltage detection lines 5 belonging to each group obtained by dividing the plurality of batteries 10 into a plurality of groups are to be pulled out from the electric wire arrangement part 64 toward the control unit 16. That is, in the structure, the other end sides of a part of the voltage detection lines 5 among the plurality of voltage detection lines 5 are pulled out from each electric wire outlet 66. By virtue of this, the plurality of batteries 10 constituting the battery assembly are divided into a plurality of groups (battery groups) and then the other end sides of the voltage detection lines 5 belonging to each battery group are pulled out through the electric wire outlet 66. That is, the plurality of voltage detection lines 5 connected through the busbars 3 to the plurality of batteries 10 constituting the battery assembly 100 are pulled out in a distributed manner in a predetermined number each (regardless of whether in the same number each or in a different number each) through the electric wire outlets 66 and then electrically connected to the control unit 16. Here, in this case, the control unit 16 includes a plurality of electric wire connection parts 161 to which the other end sides of the voltage detection lines 5 are electrically connected. Then, such an electric wire connection part 161 is provided each in correspondence to each of the electric wire outlets 66. The configuration of the electric wire connection part 161 (the method of electrical connection between the control unit 16 and the voltage detection line 5) is not limited to particular one. However, for example, a connector structure in which the voltage detection lines 5 become attachable and detachable may be employed and then connection terminals provided on the other end sides of the voltage detection lines 5 may be connected to such a connector. Alternatively, the other end sides of the voltage detection lines 5 may be joined by ultrasonic jointing, soldering, or the like. In a case that the electric wire connection parts 161 are formed in a connector structure, connection of the voltage detection lines 5 to the control unit 16 or removal of the voltage detection lines 5 from the control unit 16 can easily be performed.

Thus, the necessity is avoided that all the voltage detection lines 5 are arranged everywhere in the electric wire arrangement part 64 (that is, over the entire length (the length dimension in the frontward and rearward directions)). This reduces the arrangement space (the space surrounded by the bottom, the peripheral wall 62, and the arrangement wall 65 of the holding member 6) to be ensured in the electric wire arrangement part 64. In other words, the number of voltage detection lines 5 arranged in the same electric wire arrangement part 64 can be suppressed to an appropriate value. By virtue of this, for example, the interval of opposition of the peripheral wall 62 and the arrangement wall 65 can be narrowed and, at the same time, the height of the peripheral wall 62 and the arrangement wall 65 (the standing dimension from the bottom of the holding member 6 (the dimension in the up and down directions)) can be reduced. As a result, size reduction of the battery wiring module 1 can be achieved. Thus, for example, material cost reduction and weight reduction can be achieved in correspondence to the amount of reduction in the interval of opposition or the height of the peripheral wall 62 and the arrangement wall 65.

In the present embodiment, as shown in FIGS. 1 and 2, the electric wire arrangement part 64 is formed between each of the electrode rows 10*a*, 10*b* and the control unit 16. Then, the plurality of electric wire outlets 66 are positioned to oppose the plurality of electric wire connection parts 161 of the control unit 16, respectively. As such, when the plurality of electric wire outlets 66 and the plurality of electric wire connection parts 161 oppose each other, the voltage detection lines 5 pulled out through the electric wire outlets 66 can be electrically connected to the control unit 16 in shorter arrangement distances without large detouring. Thus, the arrangement length of each voltage detection line 5 in the electric wire arrangement part 64 can be reduced. Thus, the total extension of these voltage detection lines 5 can be reduced (wire saving can be achieved). For example, such wire saving permits fabrication cost reduction and weight reduction of the voltage detection line 5 as well as conductor resistance reduction. In addition, a wide variety in the lengths of the voltage detection lines 5 need not be prepared. Thus, equalization of the electric wire lengths can easily be achieved and hence cost reduction can be achieved also from the perspective of procurement of the voltage detection lines 5.

The mode of the electric wire outlet 66 is not limited to particular one as long as the other end side of the voltage detection line 5 can easily be pulled out from the electric wire arrangement part 64 to the control unit 16. FIGS. 1 to 3 show as an example the electric wire outlet 66 formed by cutting off the arrangement wall 65 serving as a wall on the control unit 16 side among the peripheral wall 62 and the arrangement wall 65 which are the pair of walls of the electric wire arrangement part 64. In this case, the plurality of batteries 10 constituting the battery assembly 100 are divided into three battery groups. Then, in the battery wiring module 1, three electric wire outlets 66 are formed in each of the holding members 6 formed in two rows in the frontward and rearward directions in correspondence to the electrode rows 10*a* and 10*b*. However, the number of electric wire outlets (in other words, battery groups) may be two or, alternatively, four or more. That is, it is sufficient that the voltage detection lines 5 can be pulled out from the electric wire arrangement part 64 through the electric wire outlets in a distributed manner. For example, the electric wire outlets in a different number may be formed in each of the holding members 6 formed in two rows. Further, as long as the voltage detection lines 5 can easily be pulled out from the electric wire arrangement part 64, the electric wire outlets may be formed as through holes going through the arrangement wall 65.

Further, FIGS. 1 to 3 show as an example a configuration that three electric wire outlets 66 are formed at different intervals in the arrangement wall 65 (the wall on the control unit 16 side). Instead, these electric wire outlets 66 may be formed at regular intervals. That is, as long as the number of voltage detection lines 5 arranged in the electric wire arrangement part 64 can be suppressed to an appropriate value, the plurality of electric wire outlets may be formed at predetermined intervals in the arrangement wall 65. Further, at that time, it is preferable that the electric wire outlets are provided to oppose the electric wire connection parts of the control unit.

It is preferable that: the control unit 16 includes a plurality of the electric wire connection parts 161 to which the other end sides of the voltage detection lines 5 are electrically connected; the electric wire arrangement part 64 is formed between each of the electrode rows 10*a*, 10*b* and the control unit 16; and the electric wire outlets 66 are positioned to oppose the electric wire connection parts 161 of the control unit 16.

As such, according to the present embodiment, size reduction of the battery wiring module 1 and wire saving of the voltage detection lines 5 can simultaneously be achieved.

The present invention has been described above with reference to an embodiment. However, the embodiment given above is merely an illustration of the present invention and hence the present invention is not limited only to the configuration of the embodiment given above. Thus, it is clear for the person skilled in the art that the present invention may be implemented in a mode modified or changed within the scope of the spirit of the present invention. Thus, it is obvious that such modified or changed modes belong to the scope of the claims of the present application.

Here, the features of the embodiment of the battery wiring module according to the present invention described above are briefly summarized and listed as the following [1] to [4].

[1] A battery wiring module (1) attachable to a battery assembly (100) including a plurality of batteries (10), each of the plurality of batteries (10) including a positive electrode (11) and a negative electrode (12), the battery assembly (100) in which the plurality of batteries (10) are arranged so as to form two electrode rows (10*a*, 10*b*) such that the positive electrode (11) and the negative electrode (12) of the adjacent batteries (10) are arranged to be adjacent to each other in each of the electrode rows (10*a*, 10*b*), the battery wiring module (1) including:

a plurality of connection members (busbars 3) which are attached to the electrode rows (10*a*, 10*b*), and which electrically connect adjacent positive electrode (11) and negative electrode (12) in each of the electrode rows (10*a*, 10*b*);

a plurality of voltage detection lines (5), each of which includes a first terminal electrically connected to a corresponding one of the plurality of connection members (the busbars 3) and a second terminal electrically connected to a control unit (16) for battery voltage monitoring disposed between and along the electrode rows (10*a*, 10*b*); and a holding member (6) which holds the plurality of connection members (the busbars 3) and the plurality of voltage detection lines (5) for each of the electrode rows (10*a*, 10*b*), wherein the holding member (6) includes an electric wire arrangement part (64) in which the plurality of voltage detection lines (5) are arranged and which is formed along the electrode rows (10*a*, 10*b*), wherein the electric wire arrangement part (64) includes a plurality of electric wire outlets (66), and wherein the plurality of batteries (10) are divided into a plurality of groups so as to correspond to the plurality of electric wire outlets (66), respectively, such that the second terminals of the plurality of voltage detection lines (5) belonging to one of the groups are pulled out through the corresponding one of the electric wire outlets (66) from the electric wire arrangement part (64) toward the control unit (16).

[2] The battery wiring module (1) described in the above-mentioned [1], wherein the control unit (16) includes a plurality of electric wire connection parts (161) to which the second terminals of the plurality of voltage detection lines (5) are electrically connected, respectively, wherein the electric wire arrangement part (64) is formed between each of the electrode rows (10*a*, 10*b*) and the control unit (16), and wherein the plurality of electric wire outlets (66) are positioned to oppose the respective electric wire connection parts (161) of the control unit (16).

[3] The battery wiring module (1) described in the above-mentioned [1] or [2], wherein the electric wire arrangement part (64) is formed in a gutter shape including a bottom extending along an arrangement direction of the batteries (10) and first and second walls (a peripheral wall 62, an arrangement wall 65) extending upward from the bottom, the first wall being closer to the control unit than the second wall, and wherein the electric wire outlets (66) are formed by cutting the first wall (the arrangement wall 65).

[4] The battery wiring module (1) described in the above-mentioned [3], wherein the plurality of electric wire outlets (66) are formed at predetermined intervals in the first wall (the arrangement wall 65).

The battery wiring module of the present invention is useful in a battery wiring module in which size reduction as well as wire saving of the voltage detection lines can simultaneously be achieved.

What is claimed is:

1. A battery wiring module attachable to a battery assembly comprising a plurality of batteries, each of the plurality of batteries comprising a positive electrode and a negative electrode, the battery assembly in which the plurality of batteries are arranged so as to form two electrode rows such that the positive electrode and the negative electrode of adjacent batteries are arranged to be adjacent to each other in each of the electrode rows, said battery wiring module comprising:

a plurality of connection members which are attached to the electrode rows, and which electrically connect adjacent positive electrode and negative electrode in each of the electrode rows;

a plurality of voltage detection lines, each of which comprises a first terminal electrically connected to a corresponding one of the plurality of connection members and a second terminal electrically connected to a control unit for battery voltage monitoring disposed between and along the electrode rows; and a holding member which holds the plurality of connection members and the plurality of voltage detection lines for each of the electrode rows, wherein the holding member comprises an electric wire arrangement part in which the plurality of voltage detection lines are arranged and which is formed along the electrode rows, wherein the electric wire arrangement part comprises a plurality of electric wire outlets, and wherein the plurality of batteries are divided into a plurality of groups so as to correspond to the plurality of electric wire outlets, respectively, such that the second terminals of the plurality of voltage detection lines belonging to one of the groups are pulled out through the corresponding one of the electric wire outlets from the electric wire arrangement part toward the control unit.

2. The battery wiring module according to claim 1, wherein the control unit comprises a plurality of electric wire connection parts to which the second terminals of the plurality of voltage detection lines are electrically connected, respectively, wherein the electric wire arrangement part is formed between each of the electrode rows and the control unit, and wherein the plurality of electric wire outlets are positioned to oppose the respective electric wire connection parts of the control unit.

3. The battery wiring module according to claim 1, wherein the electric wire arrangement part is formed in a gutter shape comprising a bottom extending along an arrangement direction of the batteries and first and second walls extending upward from the bottom, the first wall being closer to the control unit than the second wall, and wherein the electric wire outlets are formed by cutting the first wall.

4. The battery wiring module according to claim 3, wherein the plurality of electric wire outlets are formed at predetermined intervals in the first wall.

* * * * *